Patented Apr. 7, 1925.

1,532,952

UNITED STATES PATENT OFFICE.

EDWIN ROLKER, OF BALTIMORE, MARYLAND, ASSIGNOR TO THE PERMATITE COMPANY, A COPARTNERSHIP COMPOSED OF GEORGE BARTH, MILTON W. GATCH, AND EDWIN ROLKER, ALL OF BALTIMORE MARYLAND.

METHOD OF FORMING A PHENOLIC CONDENSATION PRODUCT.

No Drawing.   Application filed March 18, 1920. Serial No. 366,940.

*To all whom it may concern:*

Be it known that I, EDWIN ROLKER, a citizen of the United States, residing at Baltimore, in the State of Maryland, have invented certain new and useful Improvements in Methods of Forming a Phenolic Condensation Product, of which the following is a specification.

The invention relates to an improved method of reacting with formaldehyde or its polymers upon phenol or its homologues.

Condensation products resulting from the chemical action of aldehydes on phenols have been obtained by heating phenol and formaldehyde. Where no condensing agent is added, the reaction is slow, requiring heating for a long period of time and at high temperatures. To accelerate the reaction, condensing agents, in the form of various acids or salts, have been used. The reaction in such cases is usually vigorous and difficult to control. Furthermore, the condensing agent, as commonly used, is introduced directly into the reacting mass and becomes intimately mixed therewith so that it is not removable from the product without further treatment, if at all. In such processes, the base, alkali or acid used as the condensing agent, is commonly left in the product. This results in impurities in the product which impairs its value for certain uses.

The primary object of my invention is to provide a process of forming a condensation product which will enable the condensation to be effected on a commercial scale and in a simple, practical and rapid manner. One of the advantages of my improved process is that it requires much less time for the completion of the reactions than the processes heretofore used.

Another object of the invention is to provide a process that may be easily controlled and that may be arrested at any desired state in order to secure intermediate products having particular characteristics and properties.

A further object is to provide an improved condensing agent which may be used repeatedly and is comparatively inexpensive, and which possesses other distinct advantages over the condensing agents heretofore employed.

Other objects and advantages of my invention will appear more fully in the following specification and appended claims.

In a general way, the process consists in reacting on a phenolic body with a methylene-containing substance. A mixture of phenol or its homologues and formaldehyde or its polymers, is taken in about the molecular proportions required for the reaction, or approximately two volumes of phenol to one of formaldehyde. In practicing the process, I may use commercial phenol or cresol (2 parts) and commercial (40%) formaldehyde (1 part). The phenolic and methylene-containing substances and their proportions may be varied, however, without departing from my invention.

The substances are placed in a closed container to the exterior of which heat is applied. Although not requisite to the success of the process, an advantage is derived from the employment of a double-walled or water-jacketed container or one which has some other means for tempering the heat to which the contents of the container are subjected. The heating is started at a moderate temperature. In some instances, it may be desirable to increase the temperature, to accelerate the process, but it is not necessary that the temperature be increased, the best results being obtained by using a moderate degree of heat, in the neighborhood of 100° C., and maintaining the temperature of the reacting mass approximately constant by thermostatic regulation, or otherwise.

The heating may be done at ordinary atmospheric pressure, or at higher or lower pressures. Where porosity of the final condensation product is objectionable and a compact and homogeneous product is desired, an increased pressure is advantageous. Such pressure may be introduced into the closed container in any suitable manner.

The reaction is induced by the application of heat to the mixture and by the introduction into the mass within the container of a condensing agent of improved nature and form. The condensing agent which I employ is a basic salt, preferably of sodium, such as sodium carbonate, in solid form enclosed within a small perforated aluminum container. At the desired stage of the process, preferably at the start, the perforated container, with its contents, is suspended in the phenolic-aldehyde mixture. It has been found that the basic salt and aluminum, when immersed in the mixture, act as a catalytic couple and have the effect of distinctly accelerating the reaction. By the use of this catalytic couple, a more vigorous and a quicker reaction is secured than by any other condensing agent, with a consequent acceleration of the process. A further advantage of this catalyst as a condensing agent is that the salt, being in solid form and confined within a holder or container having only minute apertures, does not mix with the reacting mass to form impurities in the product. Furthermore, the salt which forms an element of my catalytic agent, is not injurious to the product even if it should become mixed therewith. The catalyst will continue its action until a definite viscosity of the intermediate product is attained. When this stage is reached, the perforated container is withdrawn from the mass. This may be done either at or just before the desired degree of viscosity of the mass has been arrived at, it being possible to arrest the reaction at any stage of the process by the withdrawal of this perforated container.

To obtain the final condensation product, I subject the intermediate condensation product to heat and pressure. An initial air pressure of sixty pounds is preferable, accompanied by a gradual increase in the temperature from that ordinarily used to a temperature corresponding to twenty or thirty pounds steam pressure for a short period (about fifteen or twenty minutes).

What I claim is:

1. A process of forming a phenolic condensation product which consists in mixing a phenolic body and a reactive methylene-containing substance, inducing reaction in the presence of a condensing agent consisting of a basic salt within a skeleton container of aluminum, and withdrawing the container and enclosed salt before the reacting mass hardens.

2. A process of forming a phenolic intermediate condensation product comprising mixing a phenolic body and a reactive methylene-containing substance, introducing therein a condensing agent consisting of a basic salt of sodium within a skeleton aluminum container and withdrawing said container before the reacting mass hardens.

3. A process of forming a phenolic intermediate condensation product comprising mixing a phenolic body and a reactive methylene-containing substance, introducing therein as a condensing agent a basic salt of sodium within a skeleton container of aluminum, applying heat to the mixture, maintaining the temperature of the reacting mass approximately constant during the reaction, and withdrawing the container from the mass before the mass hardens.

4. A process of forming a phenolic condensation product comprising mixing a phenolic body and a reactive methylene-containing substance, and subjecting the mixture to the action of a condensing agent consisting of a basic salt and aluminum.

In testimony whereof I affix my signature.

EDWIN ROLKER.